United States Patent
Fabian

[19]
[11] Patent Number: 6,048,559
[45] Date of Patent: Apr. 11, 2000

[54] PROCESS TO REMOVE MICOTOXINS FROM A LOAD OF GREEN COFFEE

[75] Inventor: Massimiliano Fabian, Trieste, Italy

[73] Assignee: Demus S.p.A., Trieste, Italy

[21] Appl. No.: 09/180,631

[22] PCT Filed: Apr. 22, 1997

[86] PCT No.: PCT/EP97/02014

§ 371 Date: Dec. 14, 1998

§ 102(e) Date: Dec. 14, 1998

[87] PCT Pub. No.: WO97/42831

PCT Pub. Date: Nov. 20, 1997

[30] Foreign Application Priority Data

May 13, 1996 [IT] Italy ................................. MI96A0960

[51] Int. Cl.⁷ ............................... A23L 1/28; A23L 1/10; A23F 5/00
[52] U.S. Cl. ........................... 426/425; 426/430; 426/432
[58] Field of Search .................................. 426/425, 427, 426/428, 430, 429, 511, 432

[56] References Cited

U.S. PATENT DOCUMENTS 4,308,291 12/1981 Werkhoff et al. .

FOREIGN PATENT DOCUMENTS

| 0 012 365 | 6/1980 | European Pat. Off. . |
| 0 114 426 | 8/1984 | European Pat. Off. . |
| 0 247 999 | 12/1987 | European Pat. Off. . |
| 2 096 497 | 2/1972 | France . |
| 26 39 066 | 3/1978 | Germany . |
| 534 487 | 4/1973 | Switzerland . |
| 568 719 | 11/1975 | Switzerland . |

OTHER PUBLICATIONS

R.J. Clarke, "coffee vol.2: Technology", pp. 69–70, Elsevier Applied Science, 1987.

*Primary Examiner*—Anthony J. Weier
*Attorney, Agent, or Firm*—Young & Thompson

[57] ABSTRACT

The green coffee is kept mixed in a container (1) wherein steam is introduced until the coffee beans become porous and permeable; hence a solvent suited to removing waxes from the surface of the coffee and the micotoxins is introduced and extracted again as soon as it has removed the desired amount of micotoxins from the coffee.

5 Claims, 1 Drawing Sheet

PROCESS TO REMOVE MICOTOXINS FROM A LOAD OF GREEN COFFEE

FIELD OF THE INVENTION

The present invention concerns a process to remove micotoxins from a load of green coffee, intending for what regards the present case as micotoxins at least those known as ochratoxins and aphlatoxins that may be present in the green coffee; as it is known, the quantities of these micotoxins in the coffee are in actual fact extremely small (e.g. a few ppb—parts per billion—that is, mg/ton may be found) and their presence may depend on the geographical area of production, on unfavourable weather trends or by shortcomings in the working and storage processes.

BACKGROUND OF THE INVENTION

There are no known industrial processes suited to removing the above mentioned micotoxins from green coffee, although it has been acknowledged that they are extremely harmful for human health, so much so that some regulations, for example in Finland and Hungary, prescribe strict limits on the contents of micotoxins in loads of coffee, under pain of destruction of the loads at the entry frontiers or prohibition of their importation.

SUMMARY OF THE INVENTION

The applicant, in pursuing an industrial process to remove micotoxins from coffee, has conducted research and tests and has experimentally achieved the following results: i) some solvents used in removing caffeine from green coffee are also suited, in given conditions, to reducing micotoxins; ii) these solvents have an immediate and fast action in removing micotoxins, but are slow in removing caffeine; iii) these solvents do not remove caffeine if, when they come into contact with the green coffee, they are already saturated with caffeine.

On the basis of these results and the recognition of the fact that a part of the micotoxins is concentrated in the waxy layer covering each of the green coffee beans, the process that is the subject of the present patent application has been developed that, as characterized in the claims, comprises the following stages:

a—introducing a load of green coffee containing micotoxins into a container in which the coffee is preferably subjected to continuous mixing at temperature conditions ranging from environmental temperature and 200° C.;

b—introducing steam into the container and upkeeping it for the time required to make the green coffee beans porous and permeable;

c—introducing into the container a solvent suited to remove the waxes and the micotoxins and extracting the solvent immediately after it has removed the waxes and a first desired amount of the micotoxins contained in the coffee;

d—recovering the solvent and separating the micotoxins contained therein;

A first alternative to said stage c) is a stage:

c'—introducing into the container a solvent saturated with caffeine and upkeeping it for at least the time necessary to remove the entire amount of micotoxins.

A second alternate process comprises the repetition of stage c) to extend the removal of micotoxins to a higher degree.

Experiments prove that the process according to the first embodiment illustrated removes a first desired part of the micotoxins, most of them, and may remove a small part of the caffeine, though without producing a caffeine-free coffee; the process complying with the first and second alternative offers the opportunity to essentially remove all the micotoxins, though to different degreees, and a quantity of caffeine that is still not such as to produce a caffeine-free coffee; in the second alternative the point of the process at which it is no longer convenient to continue with a further stage c), or it is convenient to interrupt an ongoing phase c), is easily identifiable in order to avoid removing the last micotoxins and also an undesirable amount of caffeine.

The solvent containing the micotoxins removed from the green coffee must be treated in order to recover it, separate the micotoxins and appropriately dispose of the latter.

The most commonly used solvents in removing caffeine from green coffee are dichloro methane, ethyl acetate, supercritical carbon dioxide, the same oils extracted from coffee and a water based solution saturated with all the components of coffee. These same solvents are suited to removing the micotoxins, to different degrees and in suitable conditions.

The invention finally offers the opportunity to free coffee from micotoxins.

BRIEF DESCRIPTION OF THE DRAWINGS

The invention is illustrated in detail with an example of embodiment and with the support of the drawing in which.

DETAILED DESCRIPTION OF THE INVENTION

Figure 1:
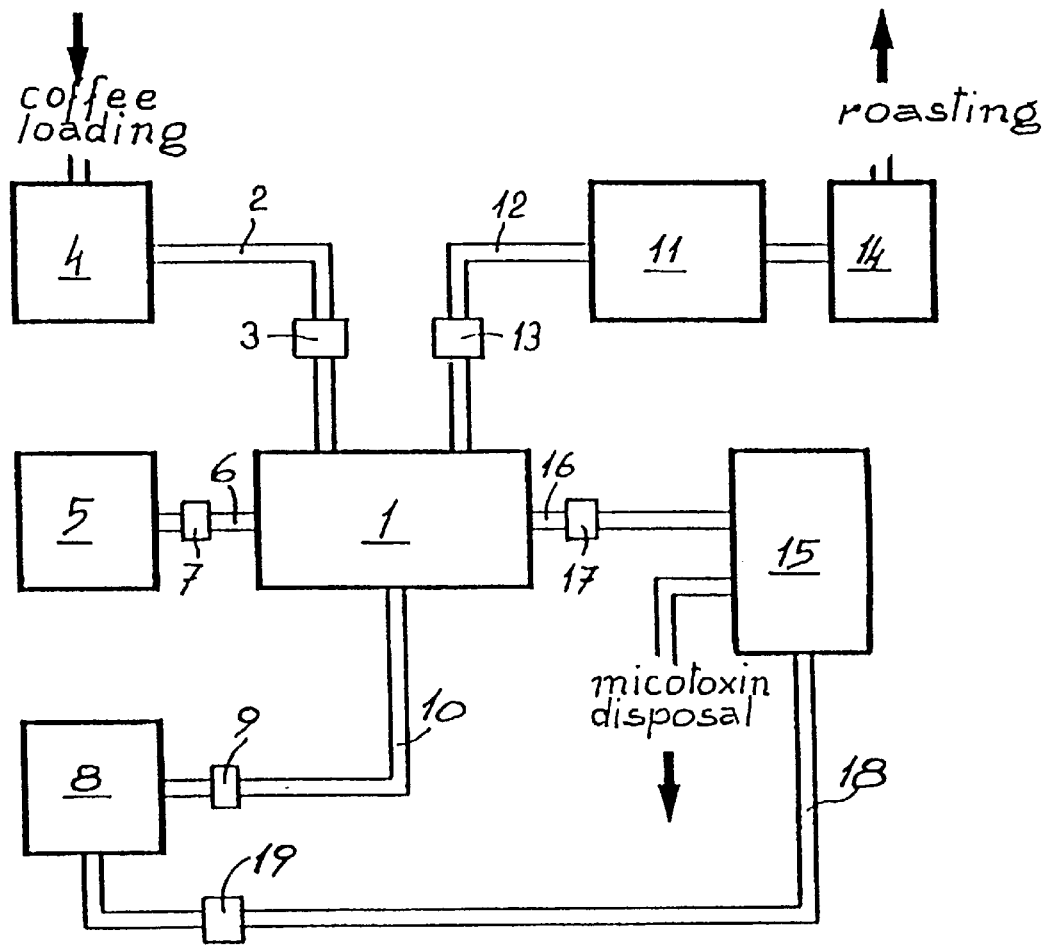
FIG. 1 is a plant design.

The FIGURE shows how in a suitable container 1 with capacity about 5000 liters, along a duct 2 controlled by a valve 3, a quantity of about 3000 kg. of green coffee is made to fall from a silo 4 into which it had previously been loaded; having completed the passage of the coffee into the container 1, steam generated by a suitable generator 5 is input into the container 1, through a duct 6 controlled by a valve 7, and is left there for about one hour, the time required to make the coffee beans porous and permeable; having concluded this stage, a convenient quantity of dichloro methane, contained in a tank 8, is delivered to container 1 by means of a pump 9 and along a duct 10; the dichloro methane is left in container 1 for a period of time, determined experimentally on the basis of the characteristics of the green coffee being treated, suited to remove most of the micotoxins contained in the green coffee, however without reaching a considerable removal of caffeine; the load of coffee treated in this way is transferred to a drying unit 11 through a duct 12 controlled by valve 13; having dried the load of coffee it is again transferred into a silo 14 for suitable conditioning before being roasted; in the meantime the dichloro methane is transferred from container 1 to a container 15 through a duct 16 controlled by a valve 17 to be recovered and sent back to tank 8 along duct 18 controlled by valve 19; the recovery of the solvent is achieved by means of distillation from a residue consisting of an emulsion of natural coffee waxes in a water based solution of caffeine in which the micotoxins previously removed are concentrated. This emulsion is treated by means of fraction crystallization in order to recover the caffeine free of micotoxins and dispose of the latter together with the waxy sub-products.

I claim:

1. A process for removing micotoxins from green coffee, comprising the following stages:

a) introducing a load of green coffee into a container wherein said load of green coffee is continuously mixed at temperature conditions ranging up to about 200° C.;

b) introducing steam into the container until single beans of coffee have become porous and permeable to steam;

c) introducing into the container a solvent adapted to remove waxes and micotoxins from the coffee, and extracting said solvent from the container as soon as it has removed all of the waxes and a first desired amount of micotoxins from the coffee; and d) recovering the solvent, and separating the micotoxins contained therein.

2. Process according to claim 1, wherein the solvent introduced into the container in stage c) is saturated with caffeine and is extracted after it has removed all of the micotoxins.

3. Process according to claim 1, further comprising repeating stages c) and d) until the solvent has also removed a second desired amount of micotoxins.

4. Process according to claim 1, wherein stage d) for recovering the solvent takes place by distillation and fraction crystallization of an emulsion of coffee waxes and of a water solution of caffeine resulting from stage c), in order to thereby separately obtain 1) the solvent, 2) caffeine free of micotoxins, and 3) the micotoxins and waxes removed from the coffee.

5. Process according to claim 1, wherein the solvent is dichloromethane.

* * * * *